United States Patent

[11] 3,602,940

[72] Inventors Raymond A. Barbeau; Edward J. Wroblewski, both of Poughkeepsie, N.Y.

[21] Appl. No. 783,926
[22] Filed Dec. 16, 1968
[45] Patented Sept. 7, 1971
[73] Assignee International Business Machines Corporation Armonk, N.Y.

[54] MAGNETIC RECORDING TAPE CLEANER
3 Claims, 2 Drawing Figs.

[52] U.S. Cl. ........................................................ 15/308, 15/93R, 79/100.2 R, 274/117
[51] Int. Cl. ........................................................ A47l 5/00, G11b 3/58
[50] Field of Search ............................................ 15/308, 306 A, 100, 93 R, 256.5, 309, 307, 4, 105, 102; 274/47; 179/100.2 R, 100.2 B

[56] References Cited

UNITED STATES PATENTS

| | | | |
|---|---|---|---|
| 3,059,266 | 10/1962 | Cleveland | 15/308 |
| 3,274,636 | 9/1966 | MacGregor | 15/306 (.1) |
| 2,912,517 | 11/1959 | Pfost | 179/100.2 T |
| 3,035,295 | 5/1962 | Buslik et al. | 15/93 R |
| 3,095,473 | 6/1963 | Roizen | 179/100.2 T |
| 3,363,066 | 1/1968 | Prochnow | 179/100.2 T |

FOREIGN PATENTS

| | | | |
|---|---|---|---|
| 1,048,148 | 12/1958 | Germany | 15/100 |

*Primary Examiner*—Walter A. Scheel
*Assistant Examiner*—Alan I. Cantor
*Attorneys*—Hanifin and Jancin and Bernard M. Goldman

ABSTRACT: A magnetic recording tape cleaner comprises an element with a tape wiping surface. Tapes are cleaned by passing them over the surface which scrapes unwanted recording material particles from the tape surface. As these particles accumulate primarily at the edges of the tape, the wiping surface is curved to apply more wiping pressure to the edges of the tape than the center thereof.

INVENTORS
RAYMOND A. BARBEAU
EDWARD J. WROBLEWSKI

BY Bernard W. Goldman
ATTORNEY

MAGNETIC RECORDING TAPE CLEANER

BACKGROUND OF THE INVENTION

1. Field of the Invention

This invention relates generally to magnetic recording and reproducing apparatus. In particular it relates to apparatus for cleaning magnetic tape surfaces.

2. Prior Art

In high density magnetic tape recording systems, for example digital data recording and video recording, it is desirable to maintain tapes in a condition in which flaws are reduced to a minimum.

Magnetic digital data recording tapes in particular have to be maintained in a condition in which at least 95 percent of the recording area can be used without error. Such tapes are expensive to produce, due in part to the cost of checking each portion very carefully. Furthermore, to retain such a high degree of error-free recording and reading, tapes are used only for a small proportion of their potential life.

Each time a tape is run through a system, particles of the magnetic surface are separated therefrom, and these tend to build up on the surface to produce errors in recording or sensing. During manufacture, tapes are produced from wide lengths of prepared material by a splitting operation, this operation tends to bend the edges. This produces a burr on one surface of a tape and a bevel on the opposite surface at each edge of the tape. As the tape passes repeatedly through a recording/reproducing system, the edges thereof contact guides, and these tend to increase the size of the burrs, and indeed to form burrs on both surfaces at both tape edges. Normally, tape is fed by means of pinch rollers, and contacts a transducing head or heads for recording or replay. Whenever the tape comes into contact with these devices, or guiding devices, particles of the surfaces tend to be removed, especially from the above-mentioned burrs. Though these particles move to positions over the complete surface, there is a greater build up at the edges, as the majority of the particles are detached from the burrs. This means that the tape becomes useless for digital recording, as, even though the central area is still relatively error free, many error portions exist in the outer recording tracks.

Though many particles can be removed easily, by, for example, vacuum devices, others adhere tenaciously. These are most easily removed by blade cleaners which scrape the recording surface. Such a cleaner is shown in U.S. Pat. No. 3,059,266, which was issued on Oct. 23, 1962 to N. G. Cleveland and assigned to the same assignee as the instant application. This shows a cleaner which comprises two blades which scrape a stationary tape. In addition, the tape is further cleaned by passing it over a perforated plate. The edges of the holes in the plate loosen the unwanted particles, which are then drawn through the holes by a vacuum port positioned on the side of the plate away from the tape wiping surface.

Many digital data magnetic tape storage units in present use have tape wiping blades at some point in the tape path, normally in the proximity of the transducing head. These blades operate in a manner similar to those shown in the above-mentioned patent, but instead of the blades moving along the tape, the tape is cleaned as it passes over the blades. Thus, for each tape pass for recording or reading data, the section of tape which passes the transducer is also cleaned by the blades.

It should be noted that all known devices which clean tape by a wiping action have a blade or surface which is straight in a direction across the tape. These devices, therefore, exert even wiping pressure on all portions across the tape. Thus, all these portions are cleaned equally. However, the extraneous particles on the surface occur mostly at the edges, so that the cleaning is more effective at the center than the edges.

Accordingly, it is an object of the invention to clean a magnetic tape equally effectively at the center and edges thereof, thereby lengthening its useful life.

It is a further object of the invention to clean a magnetic tape by contact with a wiping surface which exerts more pressure on the tape at the edges than the center thereof.

SUMMARY OF THE INVENTION

In accordance with one aspect of the invention, an improved tape cleaning device comprises an element with a tape-wiping surface which is curved in a direction transverse to the direction of the tape movement. The element may be in the form of a blade with a curved knife edge. Alternatively, the element may include a surface in the form of an arcuate cross section channel with perforations therein.

BRIEF DESCRIPTION OF THE DRAWINGS

The above and other objects of the invention will become more apparent from the following description of preferred embodiments thereof, in which reference will be made to the accompanying drawings, in which.

GENERAL DESCRIPTION

Figures 1, 2:
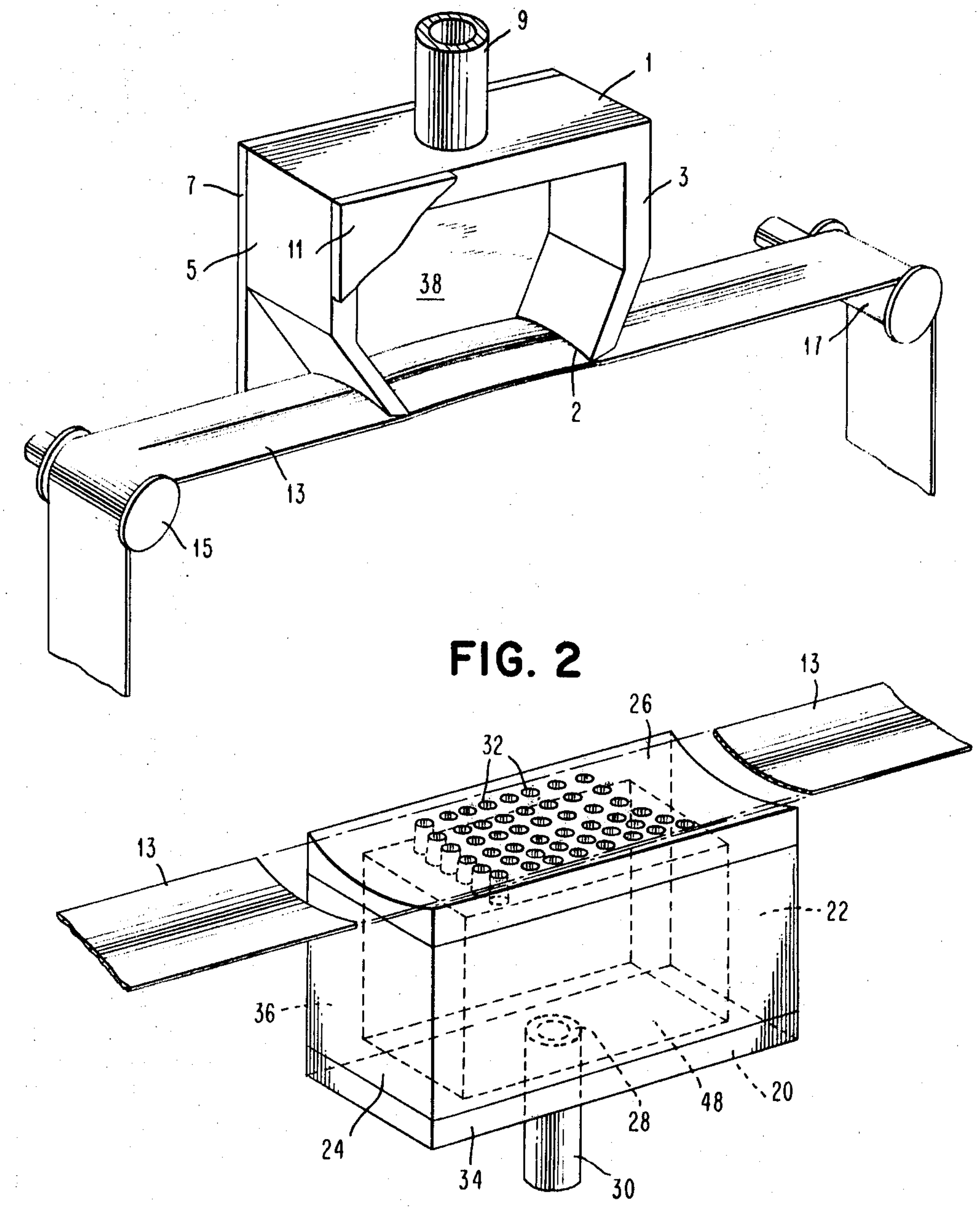
FIG. 1 is a perspective view of a first embodiment of the invention which utilizes blade cleaning elements.
FIG. 2 is a perspective view of a second embodiment of the invention which utilizes a curved perforated plate cleaning element.

In the embodiments of the invention, which will be described in more detail hereinafter, a magnetic recording tape is drawn over a cleaning surface which shears unwanted particles from the recording surface of the tape. The surfaces are curved so that the tape is bowed to conform with a surface as it is cleaned. By this means, the edges of the tape are subject to the greatest wiping pressure, and this progressively decreases towards the center of the tape.

In the first embodiment, there are two surfaces, each formed into a knife shape, one being effective for tape movement in one direction and the other being effective for movement in the opposite direction.

In the second embodiment, a curved, channel-shaped surface has holes passing therethrough. As the tape passes the holes, the edges thereof act as knives to shear unwanted particles from the recording surface.

DETAILED DESCRIPTION OF THE FIRST EMBODIMENT

Referring now to FIG. 1, this shows a tape cleaning assembly which comprises a top plate 1 having two arms 3 and 5. These arms extend vertically from the ends of the top plate 1, and their lower portions are bent inwardly. The end surfaces of the arms, for example end 2 of arm 3, are shaped to form knife edges. Both knife edges are curved in an arc.

Two sideplates 7 and 11 are provided, these extend below the ends of arms 5 and 3. The whole assembly forms a chamber 38 with its walls comprising top plate 1, arms 3 and 5, and sideplates 7 and 11, and having an open space defined by the knife edges of arms 3 and 5 and the sidewalls 7 and 11. An exhaust port 9 is connected, through a drilling (not shown) in the center of top plate 1, to the interior of the chamber. A magnetic tape 13 is driven past the end surfaces of arms 3 and 5 in a path which is defined by guide rollers 15 and 17 and the lower ends of sideplates 7 and 11. This path may form part of the tape path in a tape transport of the type shown in U.S. Pat. No. 2,792,917, which was issued May 14, 1957 to J. A. Weidenhammer et al. In such a transport mechanism, the present element would be most conveniently placed in the tape path immediately beside the transducing head, and, of course, on the same side of the tape as the transducing head.

OPERATION OF THE FIRST EMBODIMENT

It should be noted that for best operation of the subject device, a straight line runs between the tops of the tape surface contacting portions of guides 15 and 17 and the centers of the knife edges of arms 5 and 3. Thus, when a motionless tape is placed between the guides under tension, its center portion just contacts the centers of the knife edges, and its sides are curved downwardly by the knife edges in the vicinity of the cleaning assembly.

In operation, air is exhausted from chamber 38 through exhaust port 9 and tape 13 is moved past the cleaning assembly in either direction. This causes one of the knife edges (edge 2 in the case when the tape runs from left to right) to scrape particles from the tape surface. At the center of the knife edge, the wiping pressure is primarily determined by the pressure in the chamber. This is because the tape slightly bows between the knife edges due to differential pressure at its surfaces, thereby imparting a small degree of wrap around the knife edges. Outwardly from the center the wiping pressure becomes greater, due to the shape of the knife edges. Consequently, unwanted particles adhering to the tape are subject to shearing forces which increase in proportion to the distance from the center of the tape. Thus, the cleaning assembly is most effective towards the tape edges where most of the unwanted particles collect. The sheared particles are extracted from the assembly by vacuum pressure through exhaust port 9.

One example of suitable parameters for the assembly, when used to clean 0.5-inch-width tape, is as follows:

Radius of curvature of the knife edges: 3.5 inches.
Exhaust port vacuum pressure: 4 inches of water.
Speed of tape: 200 inches per second.
Longitudinal tape tension: 0.5 lb.
Blade to tape angle: 30°.

DETAILED DESCRIPTION OF THE SECOND EMBODIMENT

FIG. 2 shows a second cleaner in accordance with the invention. The cleaner comprises an assembly which includes two end walls 22 and 24, two sideplates 34 and 36, a bottom plate 20 and an upper curved surface plate 26. These plates define a central chamber 48 which is connected to an exhaust port 30 through a drilling 28 in bottom plate 20. A plurality of holes 32 connect the top surface of plate 26 to the central chamber. The top surface of plate 26 forms part of the tape path on a tape transport mechanism. This mechanism may be similar to that described with reference to FIG. 1, but in this case the magnetic recording surface of the tape is on the underside thereof.

The plates and walls of the assembly may be separate parts attached by bolts instead of the integral arrangement shown in FIG. 2. This has the advantage that in the case of surface plate wearing badly, or receiving damage, it can be replaced. Holes 32 are preferably shaped in the form of truncated cones with their bases at the central chamber 48. They can be formed in this shape by an etching process, which has the advantage of producing sharply defined edges at the top surface of plate 26. The holes are configured such that two successive rows across the tape cover substantially the complete tape width. Alternatively, they can be arranged in columns along the path, each column corresponding to a longitudinal tape recording track.

OPERATION OF THE SECOND EMBODIMENT

As was the case in the first embodiment, for best operation of the cleaning assembly, there should be a straight line between tape supports on each side of the assembly and the center of the top surface 26. Again, when a motionless tensioned tape is positioned over surface 26, its center portion just contacts the center portion of the surface, and its sides are curved upwardly by the surface contour.

In operation, air is exhausted from chamber 48 through port 30, and tape 13 is passed across surface 26. The edge of each hole 32 then serves to shear unwanted particles from the tape surface, with progressively greater pressure being applied to the tape from the center outwards. Sheared particles are extracted through the holes into chamber 38, and from there out of the assembly through port 30. Suitable operational parameters for this assembly may be substantially the same as those for the FIG. 1 embodiment, though it may be advisable to increase the vacuum pressure in chamber 48.

MODIFICATIONS TO THE FIRST AND SECOND EMBODIMENTS

It is clear that the positions of either of the described assemblies can be reversed. Thus the FIG. 1 assembly may bear upon the underside of a tape, or the FIG. 2 assembly upon the top of a tape. This, of course, depends upon the tape transport employed, and the resulting position of the tape recording surface. Though, in the above description, the tape was moved past a stationary cleaning assembly, it is possible, and in some cases preferable, to move the assembly past a stationary tape. Thus, for example, the subject assemblies may replace one or both of the cleaning devices shown in the aforementioned U.S. Pat. No. 3,059,266 or the blade and perforated surface elements shown therein may be modified by curving their active portions in a direction across the tape path.

While the invention has been particularly shown and described with reference to preferred embodiments thereof, it will be understood by those skilled in the art that various changes in form and details may be made therein without departing from the spirit and scope of the invention.

What is claimed is:

1. An improved magnetic recording tape cleaner, comprising
means defining a path for a magnetic tape,
a tape-cleaning device for contacting a magnetic surface of said tape in said path,
a concave surface on said device for engaging the magnetic surface of said tape to momentarily deform its magnetic surface to a corresponding concave cross section for applying a maximum wiping pressure at the edges and a minimum wiping pressure at the center of the tape,
said concave surface being formed with an arcuate knife edge.

2. An improved magnetic recording tape cleaner including:
means defining a path for a magnetic tape,
a tape-cleaning device comprising two spaced-apart arms,
each arm formed with a concave knife edge extending into said path for engaging a magnetic surface of said tape to deform it with a corresponding concave cross section.

3. An improved magnetic recording tape cleaner including
means defining a path for a magnetic tape,
a tape-cleaning device comprising two spaced-apart arms,
each arm formed with a concave knife edge extending into said path for engaging a magnetic surface of said tape to deform it with a corresponding concave cross section
means for partially evacuating the space between said arms to draw said tape into a concave form against each concave knife edge.